United States Patent
Gilles et al.

(10) Patent No.: US 11,067,952 B2
(45) Date of Patent: Jul. 20, 2021

(54) METHOD FOR DIGITALLY GENERATING A HOLOGRAM, DEVICE, TERMINAL DEVICE, ASSOCIATED SYSTEM AND COMPUTER PROGRAM

(71) Applicant: FONDATION B-COM, Cesson Sevigne (FR)

(72) Inventors: Antonin Gilles, Rennes (FR); Patrick Gioia, Servon sur Vilaine (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

(21) Appl. No.: 16/627,408

(22) PCT Filed: Jun. 13, 2018

(86) PCT No.: PCT/EP2018/065666
§ 371 (c)(1),
(2) Date: Dec. 30, 2019

(87) PCT Pub. No.: WO2019/001968
PCT Pub. Date: Jan. 3, 2019

(65) Prior Publication Data
US 2020/0142356 A1    May 7, 2020

(30) Foreign Application Priority Data

Jun. 29, 2017 (FR) ...................... 1756004

(51) Int. Cl.
*G03H 1/08* (2006.01)
*G03H 1/22* (2006.01)
(Continued)

(52) U.S. Cl.
CPC ......... *G03H 1/0808* (2013.01); *G03H 1/2205* (2013.01); *G06T 5/006* (2013.01);
(Continued)

(58) Field of Classification Search
CPC . G06T 5/006; G06T 15/20; G03H 2001/0825; G03H 1/0808; G03H 1/2205;
(Continued)

(56) References Cited

U.S. PATENT DOCUMENTS

2014/0320942 A1* 10/2014 Rosen .................... G03H 1/041
359/11
2016/0077339 A1 3/2016 Christmas et al.
(Continued)

OTHER PUBLICATIONS

Muroi, T, "Compensation of Hologram Distortion By Controlling Defocus Component in Reference Beam Wavefront for Angle Multiplexed Holograms", Dec. 2013, Journal of the European Optical Society—Rapid publications, Europe, vol. 8. (Year: 2013).*
International Search Report, PCT/EP2018/065666, dated Aug. 14, 2018.
Gilles Antonin et al: II Computer generated hologram from Multiview-plus-Depth data considering specular reflections, 2016 IEEE International Conference on Multimedia & Expo Workshops (ICMEW), IEEE, Jul. 11, 2016 (Jul. 11, 2016) , pp. 1-6, XP032970836, DOI: 10.1109/ICMEW.2016.7574699, abstract p. 1-p. 3.
(Continued)

*Primary Examiner* — Terrell M Robinson
(74) *Attorney, Agent, or Firm* — Nixon & Vanderhye

(57) ABSTRACT

Disclosed is a method for digitally generating a hologram in a screen plane of a hologram display device, including: obtaining intensity and depth maps of the scene corresponding to user viewpoint; projecting the points of the intensity map on planes parallel to the screen plane in a reference frame of the screen, one plane associated with one depth value of between minimum and maximum values of the depth map, a point of the intensity map projected on the plane of the planes associated with the depth value of the point in the depth map; compensating for distortion by modifying the planes of the scene, a point of one plane, called image point of an object point by conjugation of the convergent lens, being replaced by the object point; from the modified planes, propagating a complex sampled light wave to the screen plane and summation of the propagated light waves.

20 Claims, 6 Drawing Sheets

Figure 1:
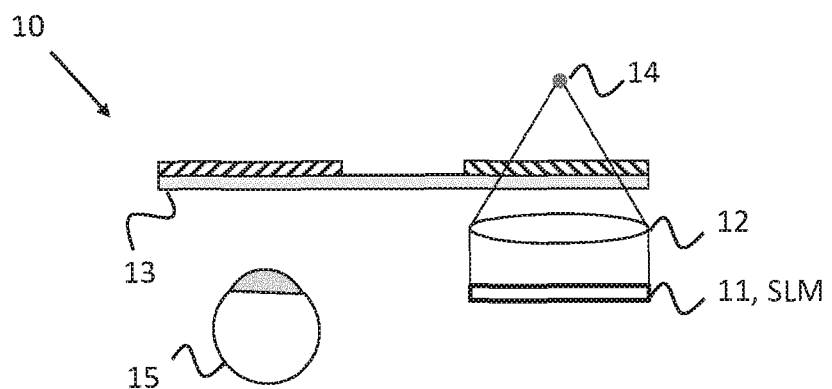

(51) Int. Cl.
*G06T 5/00* (2006.01)
*G06T 15/20* (2011.01)
(52) U.S. Cl.
CPC ..... *G06T 15/20* (2013.01); *G03H 2001/0825* (2013.01); *G03H 2001/221* (2013.01); *G03H 2210/30* (2013.01); *G03H 2222/12* (2013.01); *G03H 2223/16* (2013.01)
(58) Field of Classification Search
CPC ......... G03H 2001/221; G03H 2210/30; G03H 2222/12; G03H 2223/16
See application file for complete search history.

(56) References Cited

U.S. PATENT DOCUMENTS

2016/0314564 A1* 10/2016 Jones .................... G02B 13/007
2016/0379606 A1* 12/2016 Kollin ................... G06T 3/4038
                                                           345/428
2019/0384056 A1* 12/2019 Wu .......................... G06T 7/73

OTHER PUBLICATIONS

Ichikawa et al., "CGH calculation with the ray tracing method for the Fournier transform optical system", Opt. Express, vol. 21, No. 26, pp. 32019-32031, Dec. 2013.
Okada et al., "Band-limited double-stp Fresnel diffraction and its application to computer-generated holograms", vol. 21, No. 7, DOI:10.1364/OE.21.009192, Optics Express 9197.

* cited by examiner

METHOD FOR DIGITALLY GENERATING A HOLOGRAM, DEVICE, TERMINAL DEVICE, ASSOCIATED SYSTEM AND COMPUTER PROGRAM

1. FIELD OF THE INVENTION

The field of the invention is that of digitally generating a hologram from a real or virtual three-dimensional scene, this hologram being intended to be reproduced for a user using a head mounted display type device, that they wear on their head and which comprises a screen placed in front of their eyes.

The invention can in particular, but not exclusively, be applied to uses of virtual reality, when the observer is immersed in a three-dimensional virtual scene, or augmented reality, when the image reproduced for the user superposes an image of a virtual scene in the real world that they perceive through the see-through screen of their headset.

2. PRESENTATION OF THE PRIOR ART

For displaying colour and possibly animated holograms, a device comprising one or more liquid crystal display (LCD) screens is known, called SLM (Spatial Light Modulator), which modulate one or more laser beams in phase and/or in amplitude. The image thus produced is channelled into the visual field of the observer by a waveguide, or simply reflected by a beam separator.

A disadvantage of this display device is the low resolution of LCD screens, which limits the visual field of the observer. To overcome this disadvantage without increasing the resolution of the screens of an SLM device, it is known from the document by T. Ichikawa et al., entitled, "CGH calculation with the ray tracing method for the Fourier transform optical system," and published in the journal, Opt. Express, vol. 21, no. 26, pp. 32019-32031, in December 2013, to place a convergent lens between the SLM device and the user so as to form an enlarged hologram, and therefore offer a wider visual field to the user. However, due to the passage of the light waves modulated by the hologram through the lens, the rays are curved and the perspective of an object of the scene is thus no longer correct, i.e. it no longer corresponds to that which had been calculated at the time of generating the hologram. Faced with this problem, the authors have proposed an adaptation of their technique for generating holograms, making it possible to compensate for the inflection of the rays by using a points-based approach and a technique of tracing rays from the centre of the plane of the screen.

3. DISADVANTAGES OF THE PRIOR ART

A disadvantage of this approach is that generating the hologram is based on an approach by points, which is all the more expensive in calculation time that the scene comprises a greater number of points.

4. AIMS OF THE INVENTION

The invention improves the situation.
The invention has in particular the aim of overcoming these disadvantages of the prior art.
More specifically, an aim of the invention is to propose a solution for generating and displaying a hologram which makes it possible to enlarge the visual field of a holographic screen, rapidly and in a non-complex manner.

Another aim of the invention is to generate a small hologram, adapted to that of the screens of a head mounted display, from an actual-sized scene, which is greater in size.

5. SUMMARY OF THE INVENTION

These aims, as well as others which will subsequently appear, are achieved using a method for digitally generating a hologram of a three-dimensional scene in a plane, called screen plane, of a screen of a hologram display device, intended to be worn by a user, said screen being illuminated by a plane coherent light wave, a convergent lens being arranged between the screen and said user, such that the hologram is formed in the plane of the screen, said method comprising the following steps:

Obtaining of an intensity map and a depth map of the scene corresponding to the viewpoint of the user;

Projection according to an inverted perspective projection model of a virtual camera co-located with the user, of the points of the intensity map on a plurality of planes parallel to the screen plane in a frame of reference of the screen, one said plane being associated with a depth value of between a minimum value and a maximum value of the depth map, a point of the intensity map being projected on the plane of the plurality of planes associated with the depth value of said point in the depth map;

Compensation of a distortion induced by the convergent lens on the hologram by modifying the plurality of planes of the scene, a point of one said plane, called image point of an object point by conjugation of said convergent lens, being replaced by said object point;

from the plurality of modified planes, called object planes, propagation of a complex sampled light wave towards the screen plane and summation of the propagated light waves;

With the invention, a perspective projection of the virtual scene is produced, by positioning a virtual camera at the level of the eyes of the user, so as to reproduce the enlarged field of vision that the convergent lens provides and thus to utilise all the information of the scene contained in this enlarged field to generate a hologram in the form of a plurality of planes of the scene.

The planes of the scene thus obtained are then corrected to compensate for the distortion induced by the convergent lens in terms of curvature of light rays. The light waves emitted by each of the corrected planes are finally propagated towards the screen plane and summed to form the hologram.

The invention therefore proposes an absolutely novel approach for generating the hologram which adapts a plane-based technique, by nature less complex than a points-based technique, so as to produce a display of the hologram with an enlarged field of vision.

Due to the perspective projection that it implements, the invention furthermore makes it possible to return a 3D scene of size greater than that of the screen.

According to a first option, a spherical light source is used to illuminate the plane of the screen through the lens. In this case, it is placed in the focal plane of the lens, which makes it possible to have a plane wave at the level of the screen of the hologram.

According to a second option, a coherent plane wave is generated with a laser and the screen is directly illuminated without passing through the lens.

According to an aspect of the invention, the step of propagating the light wave emitted by an object plane comprises a control of a scale factor between a sampling interval of the object plane and a sampling interval of the screen plane.

Due to the inverted perspective projection of the points of the three-dimensional scene according to the projection model of the virtual camera, all the planes of the 3D scene do not have the same sampling interval, although they have the same resolution. In other words, the points of the plane farthest away are larger than those of the closest plane. The control of scale factor according to the invention makes it possible to consider this change of scale during the propagation of light waves from planes of the scene to the screen plane.

According to another aspect of the invention, the propagation comprises a transformation of the light wave emitted by the object plane through a kernel, calculated according to the scale factor.

It is, for example, the Fresnel-Bluestein Transform. An advantage is that this embodiment makes it possible to control the magnification independently from the propagation distance, from the wavelength or from the resolution of the plane. In addition, it is expressed in the form of a convolution product, which can be calculated effectively by using a Fast Fourier Transform. Another advantage of a convolution product is that, due to it requiring a passage into the Fourier domain, it is easy for it to add a frequential filtering so as to remove artefacts, for example due to undesired orders of diffraction.

According to another aspect of the invention, the propagation step comprises a first propagation of the light wave emitted by the object plane to an intermediate virtual plane, then a second propagation from the intermediate virtual plane to the plane of the screen, the first and the second propagation being achieved using a transform, such that the scale factor between a starting plane and an arrival plane depends on a distance between the planes and the control of the scale factor comprises a placing of the intermediate virtual plane between the object plane and the plane of the screen so as to respect the scale factor between the object plane and the plane of the screen.

For example, the propagation is achieved using a transform called Fresnel Double Step Transform.

An advantage of this method is that it makes it possible to control the scale factor using the position of the virtual plane, i.e. according to the distance travelled during the first then during the second propagation. In addition, the Fresnel Transform is expressed in the simple form of a complex multiplication followed by a Fourier Transform, and does not require doubling the number of samples of the reconstruction window. It can therefore be calculated rapidly.

Advantageously, the intermediate virtual plane is placed at a distance from the plane of the screen corresponding to the focal distance of a virtual camera, of which the inverted perspective projection of the points of the scene would produce the plurality of modified planes and the summation of the propagated light waves is achieved in the virtual plane.

An advantage of this embodiment is to be a lot less complex. Indeed, the light waves of each plane are propagated until one single virtual plane, summed, then the resulting light wave is propagated until the screen plane. It is a particular use of the preceding transform, based on an approximation made possible by the relatively low resolution of current hologram devices with respect to the wavelength of the light.

The invention also relates to a device adapted to implement the method for generating a hologram according to any one of the particular embodiments defined above. This device can, of course, comprise the different features relating to the method according to the invention. Thus, the features and advantages of this device are the same as those of the generation method, and are not detailed further.

According to a particular embodiment of the invention, such a device is comprised in an item of terminal equipment.

The invention also relates to an item of terminal equipment comprising:
 a module for obtaining description information of a three-dimensional scene,
 a device for displaying a hologram intended to be worn by an observer, said device comprising:
  a screen, placed at a predetermined distance from the eyes of the observer;
  a light source arranged so as to illuminate said screen by a plane coherent light wave, said screen being capable of modulating the light waves emitted by the source depending on the hologram;
  a convergent lens placed between the screen and said observer such that the hologram is formed in the plane of the screen; and
  a waveguide or a beam separator capable of channelling the light waves modulated by the screen in the visual field of the observer.

According to the invention, the item of terminal equipment comprises a device for digitally generating holograms according to the invention.

Advantageously, the terminal equipment is of the head mounted display type.

The invention also relates to a system comprising a server equipment comprising a module for obtaining description information of a three-dimensional scene, a device according to the invention for generating holograms from the three-dimensional scene and a module for emitting data representative of the hologram generated. It further comprises an item of terminal equipment comprising a module for receiving data representative of the hologram and a display device capable of displaying the hologram received, said device comprising:
 a screen, placed at a predetermined distance from the eyes of the observer;
 a light source arranged so as to illuminate said screen by a plane coherent light wave, said screen being capable of modulating the light waves emitted by the source depending on the hologram;
 a convergent lens placed between the screen and said observer such that the hologram is formed in the plane of the screen; and
 a waveguide or a beam separator capable of channelling the light waves modulated by the screen in the visual field of the observer.

The invention also relates to a computer program comprising instructions for implementing the steps of a method for generating a hologram such as described above, when this program is executed by a processor.

These programs can use any programming language. They can be downloaded from a communication network and/or recorded on a support which can be read by computer.

The invention finally relates to recording supports, which can be read by a processor, integrated or not with the device for generating a hologram according to the invention, possibly removable, respectively storing a computer program implementing a method for generating a hologram, such as described above.

6. LIST OF THE FIGURES

Figure 2:
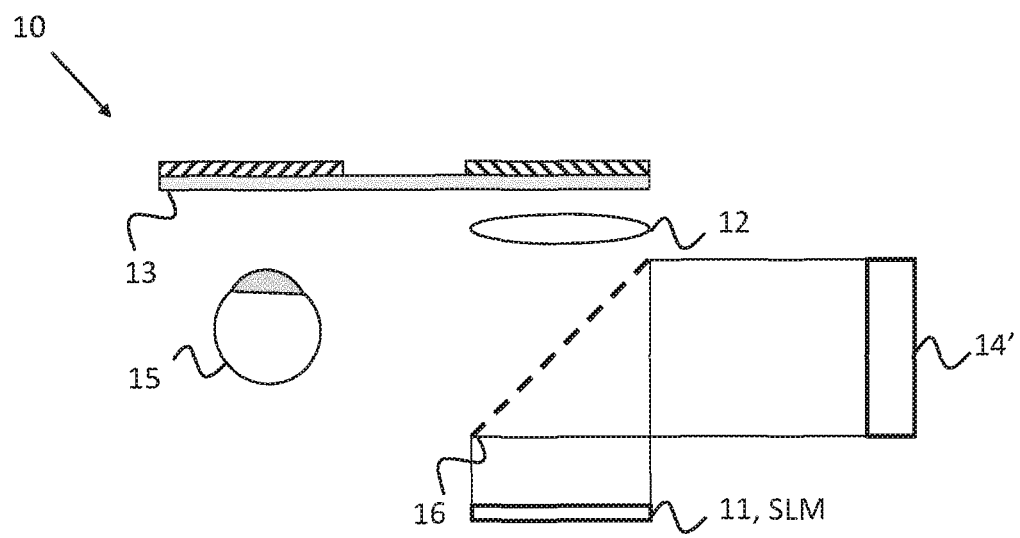
Figure 3:
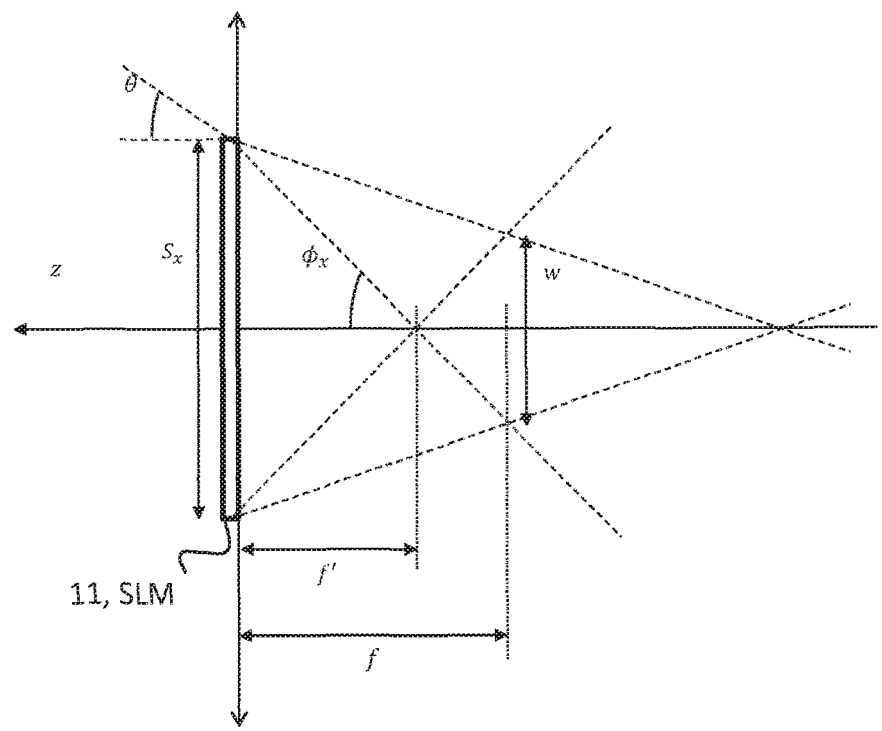
Figure 4:
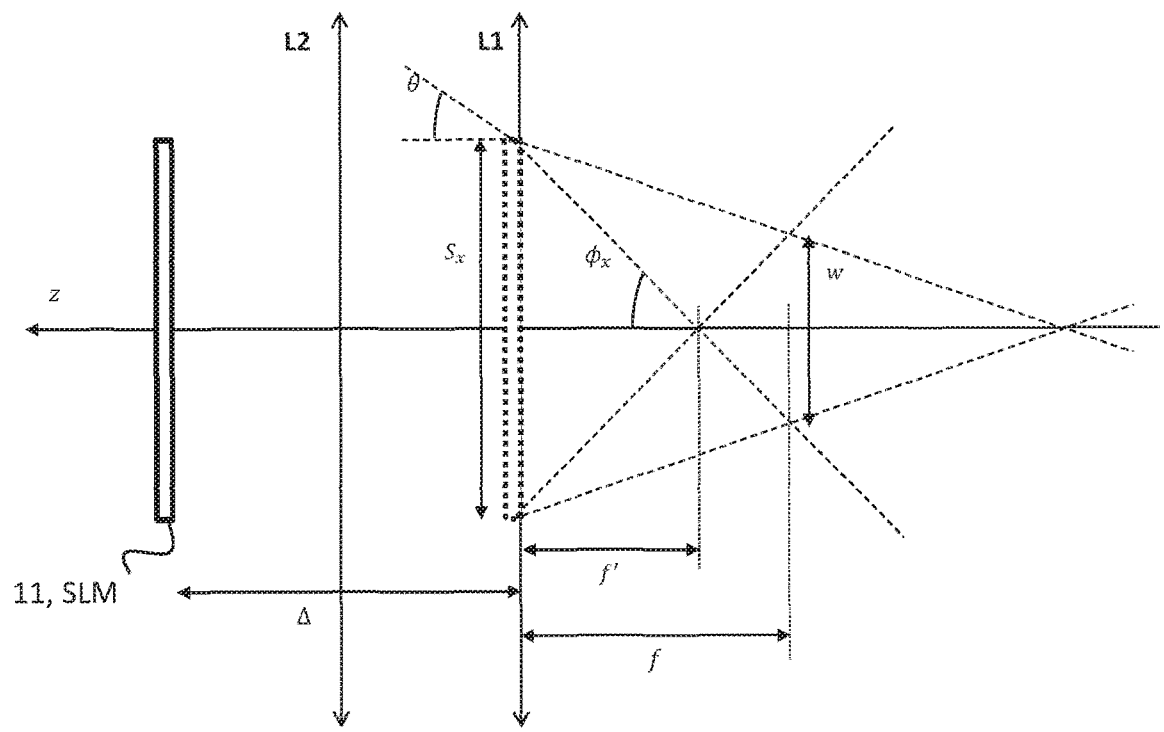
Figure 5:
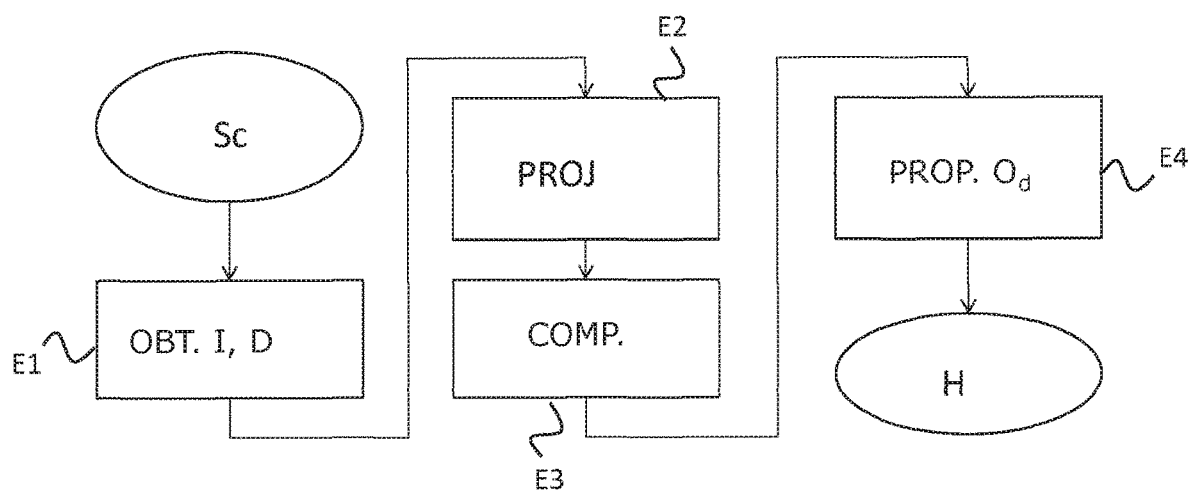
Figure 6:
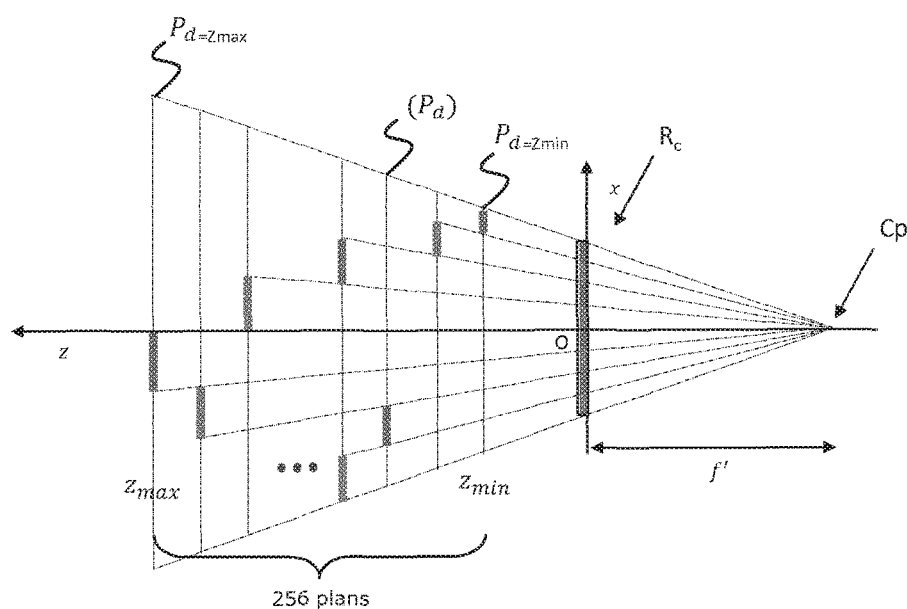
Figure 7:
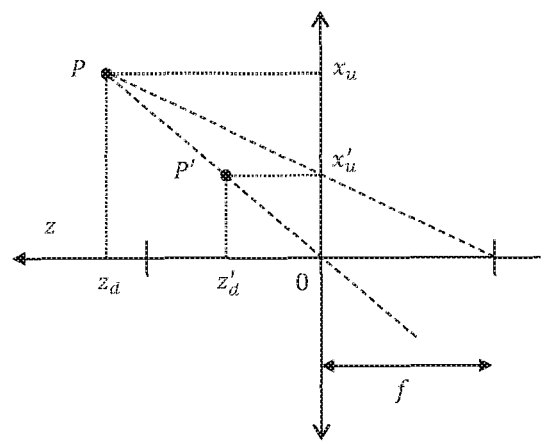
Figure 8:
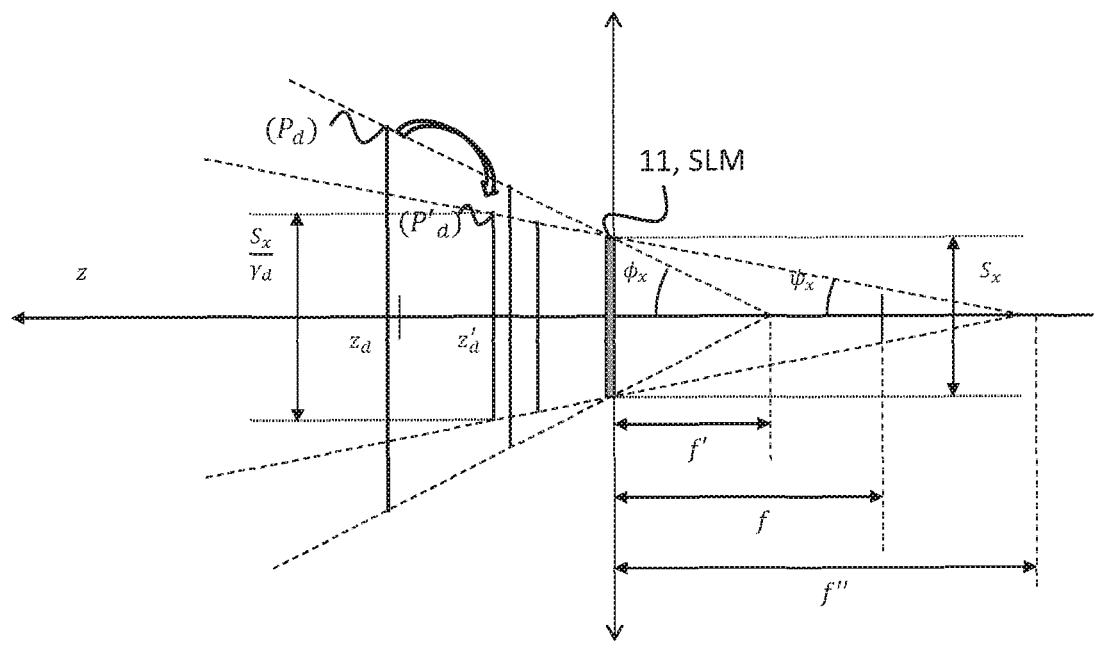
Figure 9:
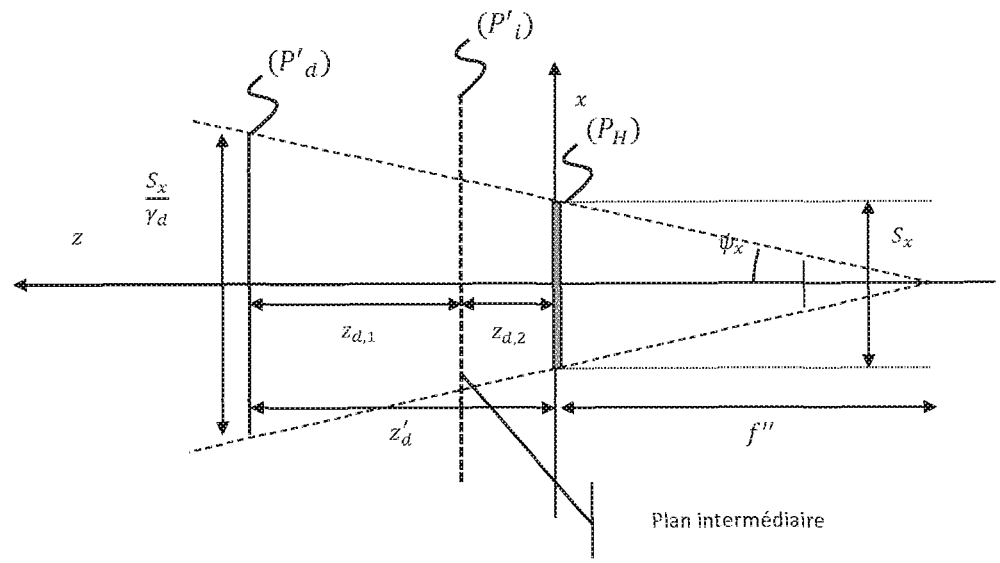
Figure 10:
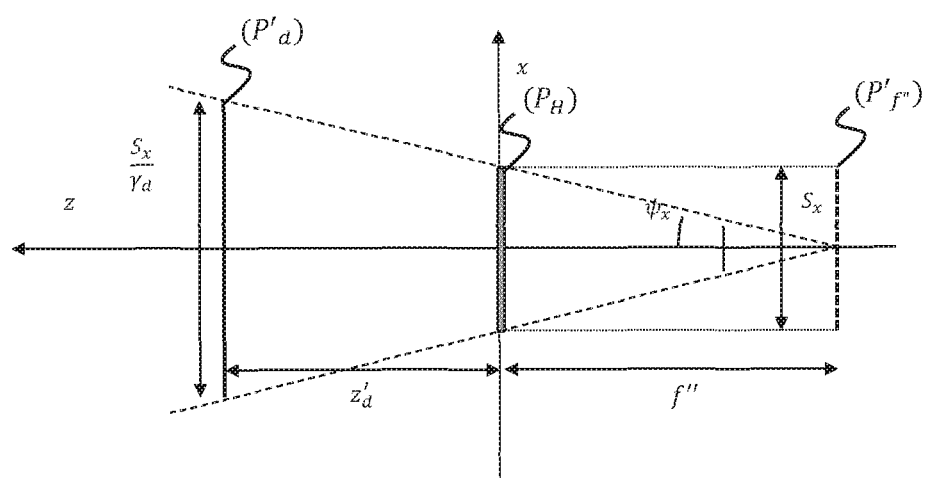
Figure 11:
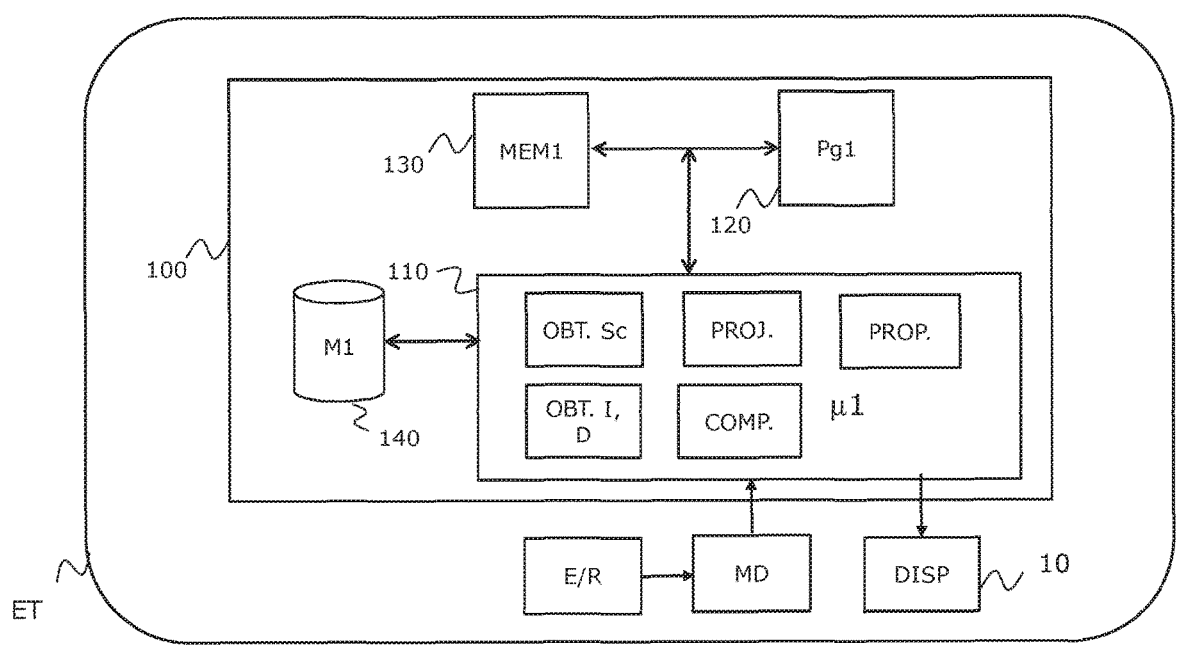
Figure 12:
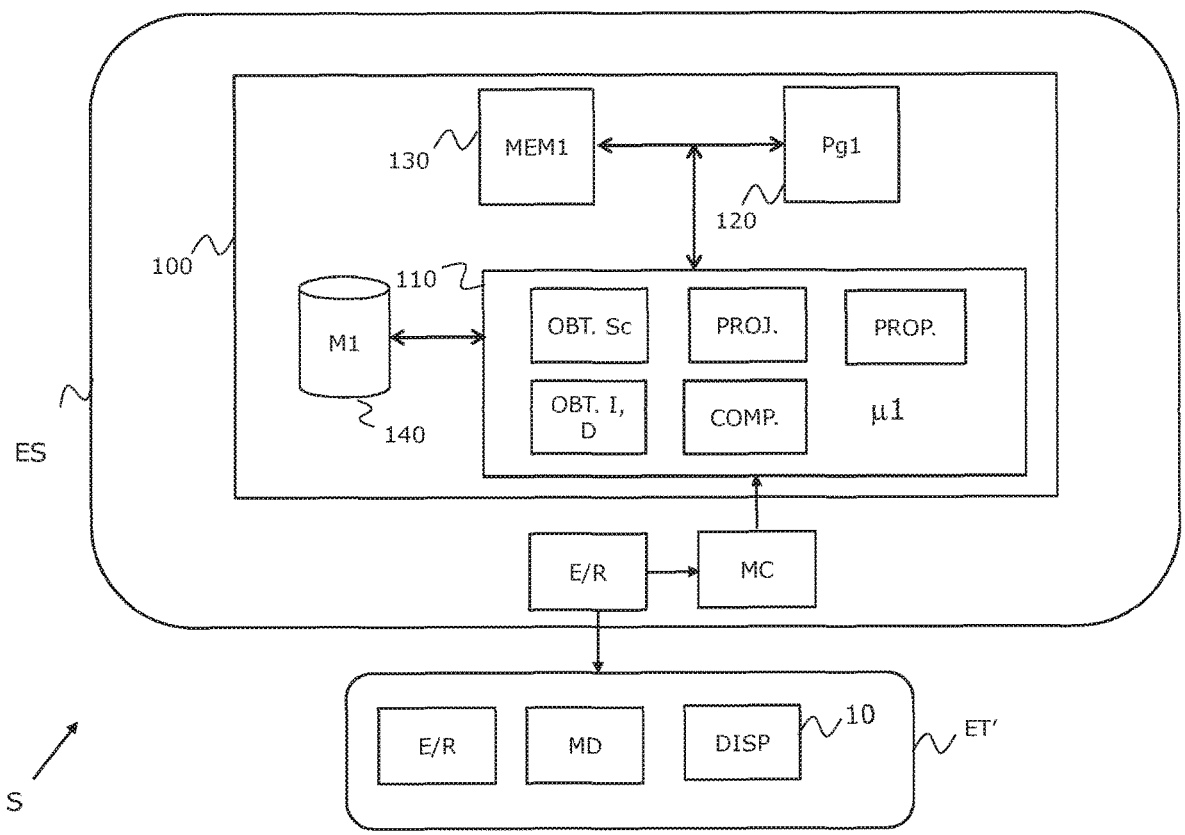

Other advantages and features of the invention will appear more clearly upon reading the following description of a particular embodiment of the invention, given as a simple illustrative and non-limiting example, and the appended drawings, from among which:

FIG. 1 schematically presents a first example of a hologram display device;

FIG. 2 schematically presents a second example of a hologram display device;

FIG. 3 presents, in a more detailed manner, a first arrangement example of the convergent lens with respect to the screen of the display device;

FIG. 4 presents, in a more detailed manner, a second arrangement example of the convergent lens with respect to the screen of the display device;

FIG. 5 schematically presents the steps of a method for digitally generating a hologram according to the invention;

FIG. 6 illustrates an inverted perspective projection example of the three-dimensional scene on a plurality of planes parallel to the screen plane, according to the invention;

FIG. 7 schematically illustrates the conjugation of an object point into an image point by a convergent lens;

FIG. 8 schematically illustrates a correction example of the plurality of the planes of the 3D scene to compensate for the distortion introduced by the convergent lens, according to the invention;

FIG. 9 schematically illustrates an intermediate virtual plane example implemented to control the magnification between a plane of the scene and the screen plane, according to a first embodiment of the invention;

FIG. 10 schematically illustrates a virtual plane example common to the plurality of planes according to a second embodiment of the invention;

FIG. 11 schematically illustrates a hardware structure example of a device for digitally generating a hologram according to the invention, when it is integrated to an item of terminal equipment; and FIG. 12 schematically illustrates a second hardware structure example of a device for digitally generating holograms according to the invention, when it is integrated to an item of server equipment.

7. DESCRIPTION OF A PARTICULAR EMBODIMENT OF THE INVENTION

The general principle of the invention is based on the generation of a hologram from the perspective projection of a 3D scene from the viewpoint of an observer, on a plurality of planes parallel to the screen plane, a correction of the positions and of the size of the planes to compensate for the distortion introduced by the convergent lens coupled with the screen and a propagation of light waves emitted by the corrected planes towards the screen plane, the hologram being formed on the screen plane by the sum of the light waves thus propagated.

In relation to FIG. 1, a device for displaying a holographic image or a sequence of holographic images 10 is considered. It comprises a screen 11 capable of modulating the light emitted by a light source S depending on a hologram H, for example, a spatial light modulator, or SLM.

The display device 10 also comprises a convergent lens 12 having a focal length f, a waveguide 13 and a coherent light point source 14. The convergent lens 12 is located between the SLM 11 and the inlet of the waveguide 13, the light source 14 is located in the focal plane of the lens 12, and the eye of the user 15 is located at the outlet of the waveguide. The spherical light wave emitted by the point source 14 is transformed into a plane wave by the lens 12 and illuminates the SLM 11. This plane wave is thus modulated by the hologram H displayed on the SLM and it is reflected towards the lens 12. The modulated wave thus passes through the lens 12, then it is transmitted by the waveguide 13 up to the eye 15 of the user.

In relation to FIG. 2, another display device 10 example is presented, according to which the light source 14 is a laser which generates a coherent plane wave. It comprises a beam separator 16, so as to directly illuminate the screen without passing through the lens.

The display device 10 is intended to be placed in front of the eyes of the user and worn on their head. Advantageously, it can be integrated to an item of terminal equipment ET of head mounted display type.

In relation to FIG. 3, the arrangement of the different parts of the equipment 10 is described in a more detailed manner by omitting, for purposes of simplicity, the waveguide. It is considered that a system of coordinates (x,y,z) such as the convergent lens 12 is located in the plane (x,y,0). The screen 11 is arranged such that the hologram H is formed in the plane of the lens. In this first example, it is coupled with the lens.

In a second example illustrated by FIG. 4, it is placed at a distance Δ from the lens, of around a few cm in the plane (x, y, Δ). In this case, the item of terminal equipment ET comprises an optical system, for example a second lens 12', arranged such that the image through this second lens of the hologram displayed on the screen is formed in the plane of the first lens 12.

The size of the screen 11 is given by $(S_x, S_y) = (N_x \cdot p, N_y \cdot p)$, with $(N_x, N_y)$ being the resolution of the screen, of around a few thousand pixels per dimension, and p being the size of the pixels, of around a few micrometres.

θ refers to the maximum diffraction angle of the screen 11. It is expressed as follows:

$$\theta = \arcsin\left(\frac{\lambda}{2p}\right),$$

with λ being the wavelength of the light source 14, of around a few hundred nanometres.

The maximum viewing field is obtained when the eye of the observer is located in the plane (x,y,−f'). It is thus given $$\text{by } \phi_x = \arctan\left(\frac{S_x}{2f'}\right)$$

in the horizontal plane and $$\phi_y = \arctan\left(\frac{S_y}{2f'}\right)$$

in the vertical plane, with $$f' = \begin{cases} \dfrac{S_x}{S_x + w} f, & S_x \geq S_y \\ \dfrac{S_y}{S_y + w} f, & S_x < S_y \end{cases}$$

$$w = 2f \tan(\theta)$$

Consequently, the viewing field $(\phi_x,\phi_y)$ of the hologram can be increased by decreasing the focal distance from the lens.

In return for the increase of the viewing field of the hologram, the lens aims to distort the geometry of the virtual scene. This distortion must therefore be considered during the calculation of the holographic video stream to be displayed on the SLM screen 11.

In relation to FIG. 5, the steps of a method for generating a hologram according to a first embodiment of the invention are described. Advantageously, it is implemented by a device 100 for generating a hologram, arranged to engage with the display device 10 of FIGS. 1 and 2 and which can be advantageously integrated at an item of terminal equipment of head mounted display type.

During a step E1, a colour intensity map and a depth map of the real or virtual 3D scene are obtained, corresponding to the viewpoint of the observer when he is placed in the plane (x, y, −f'). For this, a virtual or real 2D+Z camera is used, according to the nature of the scene, with a viewing field of $\phi_x$ and $\phi_y$ in the horizontal and vertical plane, respectively, and a resolution of $(N_x, N_y)$. If the scene is virtual, it is, for example, described in the form of a mesh or of a point cloud, and thus a virtual camera is used to construct the intensity and depth maps. If the scene is real, a real camera is resorted to.

Each point of the 3D scene of coordinates (x,y,z) in a reference frame of the camera is thus projected on an image element or pixel of coordinates (u,v) in the image plane of the camera, such that:

$$\begin{pmatrix} u \\ v \\ 1 \end{pmatrix} \sim M \begin{pmatrix} x \\ y \\ z \\ 1 \end{pmatrix} = \begin{pmatrix} \frac{f'x}{zp} + u_0 \\ \frac{f'y}{zp} + u_0 \\ 1 \end{pmatrix},$$

where the symbol ∼ means that the vectoral equality is defined possibly including a scalar factor, due to the homogenous coordinates used (in a manner known to a person skilled in the art), and M corresponds to the projection matrix of this camera in homogenous coordinates, given by:

$$M = \begin{bmatrix} f'/p & 0 & u_0 & 0 \\ 0 & f'/p & v_0 & 0 \\ 0 & 0 & 1 & 0 \end{bmatrix},$$

where $$(u_0, v_0) = \left(\frac{N_x}{2}, \frac{N_y}{2}\right)$$

are the coordinates of the main focal point of the camera, expressed in the pixel marker (known to a person skilled in the art).

Coming from this step, an intensity map I is obtained in the form of an image having dimensions $(N_x, N_y)$ of which the intensity values are of between 0 and 255 for each colour and a depth map D of the same dimensions, of which the depth values are standardised between 0 for a real depth of $z_{min}$ and 255, for a real depth of $z_{max}$.

During a step E2, the intensity and depth map points are projected according to an inverted perspective projection model of the virtual or real camera in the 3D reference frame Rc of the camera, as illustrated by FIG. 6.

As the depth D is encoded on 8 bits, each pixel (u,v) of the intensity I and depth d=D(u,v) map is projected into a point having coordinates $P(x_u, y_v, z_d)$ in the camera reference frame $R_c=(O, x, y, z)$, as follows:

$$\begin{pmatrix} x_u \\ y_v \\ z_d \end{pmatrix} = \begin{pmatrix} \frac{(z_d + f')(u - u_0)p}{f'} \\ \frac{(z_d + f')(v - v_0)p}{f'} \\ \frac{255 - d}{255}(z_{max} - z_{min}) + z_{min} \end{pmatrix}$$

with d=D(u,v). The point cloud thus projected is therefore naturally split into a set of N=256 planes $P_{z_d}$ parallel to the plane of the hologram.

However, this point cloud cannot be directly used for calculating the hologram, due to the presence of the lens 12.

During a step E3, the coordinates of the points $P(x_u, y_v, z_d)$ of the plurality of planes $(P_d)$ are modified, in order to compensate for the distortion induced by the convergent lens 12, as described below in relation to FIG. 7.

It is considered that a point $P(x_u, y_v, z_d)$ of the plane $(P_d)$ is the image point of an object point P' by the conjugation effect of the lens 12. This results in, that for each image point P of coordinates $(x_u, y_v, z_d)$, the coordinates $(x'_u, y'_v, z'_d)$ of the corresponding object point P' are given by the following expression:

$$\begin{pmatrix} x'_u \\ y'_v \\ z'_d \end{pmatrix} = \begin{pmatrix} \frac{f}{z_d + f}x_u \\ \frac{f}{z_d + f}y_u \\ \frac{f}{z_d + f}z_d \end{pmatrix}$$

This expression corresponds to the formula of conjugation by a convergent lens, known to a person skilled in the art.

As illustrated by FIG. 8, the object plane $(P'_d)$ formed by the object points P' of coordinates $(x'_u, y'_v, z'_d)$ is considered. The object plane $(P'_d)$ and the image plane $(P_d)$ do not have the same dimensions. Yet, they have the same number of pixels (Nx, Ny), but a different sampling interval. These are the object planes $(P'_d)$ which will then be used for calculating the hologram H.

In FIG. 8, the geometric relationship which exists between the object planes $(P'_d)$ formed following the step of compensating for the points of the image planes $(P_d)$ and the screen plane 11 is illustrated.

A scale factor $\gamma_d$ is defined between the object plane $(P'_d)$ and the screen plane 11.

It is expressed as follows:

$$\gamma_d = \frac{p}{p'_d} = \frac{p}{\frac{f}{z_d + f}p_d} = \frac{p}{\frac{f}{z_d + f}\frac{(z_d + f')p}{f'}} = \frac{f'(z_d + f)}{f(z_d + f')}$$

The size of the object plane (P'$_d$) is therefore given by $$\frac{S_x}{\gamma_d}.$$

$\gamma_d$ has a value of less than 1. This is therefore a reduction.

The focal distance f" is now considered of a virtual camera, of which the inverted projection model would project the points of the 3D scene on the plurality of object planes (P'$_d$) and $\psi_x$ the angle of the corresponding visual field.

By application of the intercept theorem, the following happens:

$$\frac{f''}{f'' + z'_d} = \frac{S_x}{S_y} = \gamma_d = \frac{f'(z_d + f)}{f(z_d + f')}$$

$$f'' = (f'' + z'_d)\frac{f'(z_d + f)}{f(z_d + f')}$$

$$f''\left(1 - \frac{f'(z_d + f)}{f(z_d + f')}\right) = \frac{fz_d}{z_d + f}\frac{f'(z_d + f)}{f(z_d + f')}$$

$$f''\frac{z_d(f - f')}{f(z_d + f')} = \frac{f'z_d}{(z_d + f')}$$

$$f'' = \frac{ff'}{f - f'}$$

If $S_x \geq S_y$, the following happens:

$$f'' = \frac{S_x f}{w} = \frac{S_x}{2\tan(\theta)}$$

$$\psi_x = \arctan\left(\frac{S_x}{2f''}\right) = \theta$$

$$\psi_y = \arctan\left(\frac{S_y}{S_x}\tan(\theta)\right)$$

Conversely, if $S_x < S_y$, the following happens:

$$f'' = \frac{S_y f}{w} = \frac{S_y}{2\tan(\theta)}$$

$$\psi_x = \arctan\left(\frac{S_x}{S_y}\tan(\theta)\right)$$

$$\psi_y = \arctan\left(\frac{S_y}{2f''}\right) = \theta$$

During a step E4, the light waves emitted by the object planes (P'$_d$) are propagated on the plane of the screen.

The depth (P'$_d$) having depth d is considered as a surface light source which emits the light wave given by:

$$o_d(x, y) = \sum_{\substack{u,v \\ D(u,v)=d}} \sqrt{I(u, v)} \exp(j\phi_{u,v}) h(x, y) * \delta(x - x'_u, y - y'_v)$$

where $\phi_{u,v} \in [0, 2\pi]$ is the initial phase making it possible to control the dispersion of light emitted by each point, h is a window function which makes it possible to control the size thereof, and $\delta$ is the Dirac impulse.

In an embodiment, the phase $\phi_{u,v}$ can be defined as a uniform random variable, providing a diffuse rendering of the scene, but other distributions can be used. In the same manner, several windowing functions can be used for h. An embodiment is to use a Gaussian distribution:

$$h(x, y) = \exp\left(-\frac{x^2 + y^2}{2\sigma^2}\right),$$

but, a rectangular window or a Hann window would have also been able to be used.

To simplify the calculations, $o_d$ is sampled on a regular grid having a resolution ($N_x, N_y$). In relation to FIG. 8, the sampling interval is defined on the plane (P'$_d$) as follows:

$$p'_d = \frac{p}{\gamma_d} = \begin{cases} \dfrac{2(z'_d + f'')\tan(\theta)}{N_x}, & S_x \geq S_y \\ \dfrac{2(z'_d + f'')\tan(\theta)}{N_y}, & S_x < S_y \end{cases}$$

The last step of calculating the hologram consists of propagating the light emitted by the scene in the plane of the screen 11. For this, the light waves emitted by each plane are digitally propagated until the plane of the screen and summed to obtain the hologram H of the scene, such that $$H(x, y) = \sum_d P_{z'_d, \gamma_d}\{o_d\}(x, y)$$

with $P_{z'_d, \gamma_d}$ being a formula for propagating the light making it possible to control the magnification $\gamma_d$ between the sampling interval p'$_d$ on the object plane, called source plane, and the sampling interval p on the plane of the hologram, called destination plane.

According to a first embodiment of the invention, this propagation is achieved using a propagation technique called the Fresnel-Bluestein technique, known to a person skilled in the art and, for example, described in the document by Restrepo et al., entitled "Magnified reconstruction of digitally recorded holograms by Fresnel-Bluestein transform", published in the journal "Appl. Opt.", vol. 49, no. 33, pp. 6430-6435, in November 2010, given by $$P_{z'_d, \gamma_d}\{o_d\}(x, y) =$$

$$\frac{\exp(j2\pi z'_d/\lambda)}{j\lambda z'_d}\exp\left(-\frac{j\pi}{\lambda z'_d}\gamma_d(1 - \gamma_d)(x^2 + y^2)\right)\mathcal{F}^{-1}\{\mathcal{F}\{f(\xi, \eta)\}\mathcal{F}\{g(\xi, \eta)\}\}$$

with $$f(\xi, \eta) = o_d(\xi, \eta)\exp\left(\frac{j\pi}{\lambda z'_d}(1 - \gamma_d)(\xi^2 + \eta^2)\right)$$

$$g(n, m) = \exp\left(\frac{j\pi}{\lambda z'_d}\gamma_d(\xi^2 + \eta^2)\right)$$

where $\xi$ and $\eta$ are the coordinates of a point in the object plane (P'$_d$).

The propagation of a light wave $o_d(\xi, \eta)$ of the object plane towards the plane of the hologram is calculated by achieving a convolution product of the wave with a kernel g(n,m) which depends on the scale factor between the two planes.

According to a second embodiment of the invention, which will now be described in relation to FIG. 9, this propagation is achieved by using a transform, called DSF ("Double-Step Fresnel diffraction"), defined as follows:

$$P_{z'_d,\gamma_d}\{o_d\}(x,y) = SSF_{z_{d,2}}\{SSF_{z_{d,1}}\{o_d\}\}(x,y)$$

where $SSF_z$ is the Fresnel propagation (1FFT), given by:

$$SSF_z\{o_d\}(x, y) = \frac{e^{jkz}}{jkz} e^{\frac{jk}{2z}(x^2+y^2)} \mathcal{F}\left\{o_d(\xi, \eta) e^{\frac{jk}{2z}(\xi^2+\eta^2)}\right\}(x, y)$$

The DSF consists of successively applying two Fresnel propagations, first from the object plane ($P'_d$) to an intermediate virtual plane ($P'_i$), then from the intermediate virtual plane to the plane of the hologram. The sampling interval of the destination plane of the Fresnel propagation depends on a distance between the source plane and the destination plane. Consequently, the action of resorting to an intermediate virtual plane, makes it possible to select the two distances $z_{d,1}$ and $z_{d,2}$ so as to control the magnification $\gamma_d$ between the sampling interval $p_d$ on the object plane and the sampling interval $p$ on the plane of the hologram 11. The intermediate distances $z_{d,1}$ and $z_{d,2}$ are given by $$\begin{cases} z_{d,1} = \frac{z'_d}{\gamma_d + 1} \\ z_{d,2} = \frac{\gamma_d z'_d}{\gamma_d + 1} \end{cases}$$

For example, for $z'_d=1$ m and $\gamma_d=0.25$, the following happens: $z_{d,1}=0.8$ m and $z_{d,2}=0.2$ m.

According to a third embodiment of the invention, illustrated by FIG. 10, the propagation of light is again achieved with the DSF technique, but furthermore, the fact that the current SLM screens have a low resolution is utilised, i.e. that the sampling interval thereof p is greater than $2\lambda$, which is the case for all of the SLM screens of the current market. Indeed, in this case, the following approximation can be considered:

$$\tan\left(\arcsin\left(\frac{\lambda}{2p}\right)\right) \approx \frac{\lambda}{2p}$$

with an error of less than 3%.

So, the following happens:

$$p'_d = \begin{cases} \dfrac{2(z'_d+f'')\tan\left(\arcsin\left(\frac{\lambda}{2p}\right)\right)}{N_x} \approx \dfrac{(z'_d+f'')\lambda}{N_x p}, & S_x \geq S_y \\ \dfrac{2(z'_d+f'')\tan\left(\arcsin\left(\frac{\lambda}{2p}\right)\right)}{N_y} \approx \dfrac{(z'_d+f'')\lambda}{N_y p}, & S_x < S_y \end{cases}$$

$$f'' = \begin{cases} \dfrac{N_x p}{2\tan\left(\arcsin\left(\frac{\lambda}{2p}\right)\right)} \approx \dfrac{N_x p^2}{\lambda}, & S_x \geq y \\ \dfrac{N_y p}{2\tan\left(\arcsin\left(\frac{\lambda}{2p}\right)\right)} \approx \dfrac{N_y p^2}{\lambda}, & S_x < S_y \end{cases}$$

So, the following can be set:

$$\begin{cases} z_{d,1} = z'_d + f'' \\ z_{d,2} = -f'' \end{cases}$$

Therefore, one single intermediate virtual plane ($P'_i$) common to all the object planes can be defined.

Generally, $f'' \approx 10$ cm.

Indeed, by using the Fresnel propagation (1FFT), the sampling interval ($p'_x, p'_y$) on the destination plane is given by the sampling interval ($p_x, p_y$) on the source plane such that $$\begin{cases} p'_x = \dfrac{\lambda|z|}{N_x p_x} \\ p'_y = \dfrac{\lambda|z|}{N_y p_y} \end{cases}$$

By putting $p_x=p_y=p'_d$, the sampling interval ($p''_x, p''_y$) is obtained in the plane of the hologram by:

$$p''_x = \frac{\lambda f''}{N_x \frac{\lambda(z'_d + f'')}{N_x p'_d}} \approx p$$

$$p''_y = \frac{\lambda f''}{N_y \frac{\lambda(z'_d + f'')}{N_y p'_d}} \approx p$$

Therefore, it is verified that the sampling interval in the plane of the hologram is respected.

In this third embodiment, the light waves emitted by each object plane are thus digitally propagated until the virtual plane ($P'_i$)=($P'_{f''}$), then propagated from this virtual plane until the plane of the hologram and finally summed to obtain the hologram H of the scene, such that $$H(x, y) = \sum_d SSF_{-f''}\{SSF_{z'_d+f''}\{o_d\}\}(x, y)$$

An advantageous option is to sum the waves digitally propagated until the virtual plane ($P'_{f''}$), then to propagate the resulting wave by an SSF until the plane of the hologram, as follows:

$$H(x, y) = SSF_{-f''}\left\{\sum_d SSF_{z'_d+f''}\{o_d\}\right\}(x, y)$$

The complexity of this embodiment is therefore divided by two with respect to the more general embodiment.

It will be noted that the invention which has just been described, can be implemented by means of software and/or hardware components. With this in mind, the terms "module" and "entity", used in this document, can correspond, either to a software component, or to a hardware component, or also to a set of hardware and/or software components, capable of implementing the function(s) described for the module or the entity in question.

In relation to FIG. 11, now a simplified structure example of a device 100 for generating a hologram according to the invention is presented. The device 100 implements the method for digitally generating a hologram according to the invention which has just been described.

For example, the device 100 comprises a processing unit 110, equipped with a processor µ1, and controlled by a computer program $Pg_2$ 120, stored in a memory 130 and implementing the method according to the invention.

Upon initialisation, the code instructions of the computer program $Pg_1$ 120 are, for example, loaded into a RAM memory before being executed by the processor of the processing unit 110. The processor of the processing unit 110 implements the steps of the method described above, according to the instructions of the computer program 120. In this embodiment example of the invention, the device 100 comprises a reprogrammable calculation machine or a dedicated calculation machine, capable of and being configured to:

Obtaining an intensity map and a depth map of the scene corresponding to a viewpoint of the observer from description information of the scene;

Projecting, according to an inverted perspective projection model of a virtual camera co-located with the observer, of the points of the intensity map on a plurality of planes parallel to the screen plane in a reference frame of the screen plane, a plane being associated with a depth value of between a minimum value and a maximum value of the depth map, a point of the intensity map being projected on the plane of the plurality of planes associated with the corresponding depth value thereof in the depth map;

Compensating for a distortion induced by the convergent lens on the hologram by modifying the plurality of planes of the scene, a point of one said plane, called image point of an object point by conjugation of said convergent lens, being replaced by the object point; and From the plurality of modified planes, called object planes, propagating one complex sampled light wave per plane towards the screen plane and summing the propagated light waves.

Advantageously, the calculation machine is configured to implement the embodiments of the invention which have just been described in the different embodiments thereof. In particular, it is capable of propagating a light wave from each of the planes of the plurality of modified planes towards the screen plane by controlling the scale factor between the modified plane and the screen plane.

The device 100 further comprises a storage unit $M_1$ 140, such as a memory, for example of buffer memory type, capable of storing, for example, the intensity I and depth maps constructed from description information of the scene Sc, the plurality of planes of the scene obtained by rear projection of the points of the I and D maps, then the plurality of modified planes to compensate for the distortion induced by the lens 12.

These units are controlled by the processor $\mu_1$ of the processing unit 110.

Advantageously, such a device 100 can be integrated to an item of terminal equipment ET, for example of head mounted display type. The device 100 is thus arranged to engage at least with the following modules of the terminal ET:

an E/R module for emitting/receiving data, by way of which the description information of the 3D scene are received via a telecommunications network, for example a wired, wireless network or a terrestrial network;

a display device DISP 10 capable of reproducing the hologram generated according to the invention, comprising:
 a screen 11, for example of SLM type, placed at a predetermined distance from the eyes of the observer;
 a coherent light source 14, 14' arranged so as to illuminate said screen with a coherent plane wave, said screen being capable of modulating the light waves emitted by the source depending on to the hologram;
 a convergent lens 12 placed between the screen and said observer, such that the hologram is formed in a plane of the lens; and
 a waveguide 13 or a beam separator capable of channelling light waves modulated by the screen in the visual field of the observer.

In this embodiment of the invention, all the steps of the method according to the invention are carried out by the head mounted display. In the case of a virtual scene, it is transmitted in the form of a mesh or a point cloud to the headset.

In the case of a real scene, the intensity and depth maps are, for example, acquired using a 2D+Z camera, then transmitted in the form of a stream to the head mounted display.

According to a first variant, illustrated by FIG. 12, a system S is considered, according to which the device 100 is integrated to an item of server equipment ES comprising a module for emitting data MER, by way of which it transmits data representative of the hologram generated according to the invention to an item of terminal equipment ET' of head mounted display type, arranged, for example as described above, to display the hologram using the display device 10. For example, the data representative of the hologram are coded by the server equipment ES in a coding module MD, transmitted in a telecommunications network, for example wireless, received by the E/R module of the terminal equipment ET' in the form of a stream of coded data according to a coding standard such as HEVC/H.265, AVC/H.264 or a future Post-HEVC standard, or also in any type of proprietary video coders/decoders. In this case, the terminal equipment ET' further comprises a module for decoding MD the stream, capable of producing description information of the scene to the device 100 according to the invention.

According to a second variant, a first portion of the steps of the method for generating a hologram is carried out by the server equipment ES and a second portion by the terminal equipment. For example, the obtaining of the scene by image synthesis for a virtual scene or from a stereo or 2D+Z camera for a real scene, the obtaining of intensity and depth maps are achieved on the server equipment, then transmitted to the terminal equipment, which carries out the inverted projection, compensation and propagation steps. The hologram is then sent to the head mounted display in the form of a coded video stream.

In this case, the intensity and depth maps are transmitted to the head mounted display in the form of a coded video stream and the hologram is calculated on the fly in the head mounted display.

The invention which has just been presented is applied, in particular, to augmented/mixed reality. It is about increasing the reality such as it is perceived by a user of a head mounted display using holograms generated using the method according to the invention.

It goes without saying, that the embodiments which have been described above have been given in a manner which is purely informative and not at all limiting, and that numerous modifications can easily be applied to them by a person skilled in the art, without moving away from the scope of the invention.

The invention claimed is:

1. A method for digitally generating a hologram from a three-dimensional scene in a screen plane of a screen of a hologram display device, said screen being illuminated by a plane coherent light wave, a convergent lens being disposed between the screen and a user, such that the hologram is formed in the plane of the screen, said method comprising:
   obtaining an intensity map and a depth map of the three-dimensional scene corresponding to a viewpoint of the user;
   projecting, according to an inverted perspective projection model of a virtual camera co-located with the user, points of the intensity map on a plurality of planes parallel to the screen plane in a reference frame of the screen, one of the planes being associated with one depth value between a minimum value and a maximum value of the depth map, one of the points of the intensity map being projected on the plane of the plurality of planes associated with the depth value of said point in the depth map;
   compensating for a distortion induced by the convergent lens on the hologram by modifying the plurality of planes of the scene to result in a plurality of modified object planes, a point of one of the planes, that is an image point of an object point by conjugation of said convergent lens, being replaced by said object point; and
   from the plurality of modified object planes, propagating complex sampled light waves to the screen plane and summing the propagated complex sampled light waves.

2. The method for digitally generating a hologram according to claim 1, wherein said propagating each of the light waves emitted by the respective object plane comprises a control of a scale factor between a sampling interval of the object plane and a sampling interval of the screen plane.

3. The method for digitally generating a hologram according to claim 2, wherein said propagating the light waves emitted by the object plane comprises a convolution of the light wave emitted by the object plane by a kernel, calculated according to the scale factor.

4. A non-transitory computer-readable medium on which is recorded a computer program comprising program code instructions which, when executed by a computer, performs the method according to claim 3.

5. The method for digitally generating a hologram according to claim 2, wherein said propagating each of the light waves emitted by the object plane comprises a first propagation of the respective light wave emitted by the object plane until an intermediate virtual plane, then a second propagation from the intermediate virtual plane until the plane of the screen, the first and the second propagations being achieved using a transform, such that the scale factor between a starting plane and an arrival plane depends on a distance between the planes, and
   wherein the control of the scale factor comprises a placing of the intermediate virtual plan to respect the scale factor between the object plane and the plane of the screen.

6. The method for digitally generating a hologram according to claim 5, wherein the intermediate virtual plane is placed at a distance from the plane of the screen corresponding to a focal distance of a virtual camera, of which an inverted perspective projection of the points of the scene would produce the plurality of modified planes, and wherein the summing of the propagated light waves is achieved in the virtual plane.

7. A non-transitory computer-readable medium on which is recorded a computer program comprising program code instructions which, when executed by a computer, performs the method according to claim 6.

8. A non-transitory computer-readable medium on which is recorded a computer program comprising program code instructions which, when executed by a computer, performs the method according to claim 2.

9. A non-transitory computer-readable medium on which is recorded a computer program comprising program code instructions which, when executed by a computer, performs the method according to claim 5.

10. A non-transitory computer-readable medium on which is recorded a computer program comprising program code instructions which, when executed by a computer, performs the method according to claim 1.

11. The method of claim 1, wherein the hologram display device is configured to be wearable by a user.

12. The method for digitally generating a hologram according to claim 11, wherein said propagating each of the light waves emitted by the respective object plane comprises a control of a scale factor between a sampling interval of the object plane and a sampling interval of the screen plane.

13. A non-transitory computer-readable medium on which is recorded a computer program comprising program code instructions which, when executed by a computer, performs the method according to claim 12.

14. A non-transitory computer-readable medium on which is recorded a computer program comprising program code instructions which, when executed by a computer, performs the method according to claim 11.

15. A device for digitally generating a hologram of a three-dimensional scene in a screen plane of a screen of a display device configured to display a hologram, said screen being illuminated by a plane coherent light source, a convergent lens being disposed between the screen and an observer such that the hologram is formed in a plane of the convergent lens, said device comprising:
   at least one processor configured to:
      obtain an intensity map and a depth map of the three-dimensional scene corresponding to a viewpoint of the observer;
      project, according to an inverted perspective projection model of a virtual camera co-located with the observer, points of the intensity map on a plurality of planes parallel to the screen plane in a reference frame of the screen plane, one of the planes being associated with a depth value between a minimum value and a maximum value of the depth map, one of the points of the intensity map being projected on the plane of the plurality of planes associated with the corresponding depth value thereof in the depth map;
      compensate for a distortion induced by the convergent lens on the hologram by modifying the plurality of planes of the scene to result in a plurality of modified object planes, a point of one of the planes that is an image point of an object point by conjugation of said convergent lens, being replaced by the object point;
      from the plurality of modified object planes, propagate a complex sampled light wave per plane to the screen plane and sum the propagated complex sampled light waves.

16. A terminal equipment comprising:
   at least one processor configured to obtain description information of a three-dimensional scene;

the device for digitally generating holograms according to claim 15; and the display device configured to display the hologram, the display device being configured to be worn by the observer, said display device comprising:

the screen disposed at a predetermined distance from eyes of the observer, the plane coherent light source configured to illuminate said screen by a plane coherent light wave, said screen being configured to modulate the light waves emitted by the source depending on the hologram, the convergent lens disposed between the screen and said observer, such that the hologram is formed in the plane of the screen, and a waveguide or a beam separator configured to channel the light waves modulated by the screen in a visual field of the observer.

17. A system comprising:

a head-mounted display terminal equipment; and a server equipment comprising the device for digitally generating the hologram according to claim 15, and an emission system configured to emit data representative of the generated holograms to the terminal equipment, wherein the terminal equipment comprises the display device configured to display the hologram and configured to be worn by an observer, said display device comprising:

the screen configured to be placed at a predetermined distance from eyes of the observer, the plane coherent light source configured to illuminate said screen by a plane coherent light wave, said screen being configured to modulate the light waves emitted by the source depending on the hologram, the convergent lens disposed between the screen and said observer, such that the hologram is formed in the plane of the screen, and a waveguide or a beam separator configured to channel the light waves modulated by the screen in a visual field of the observer.

18. The device of claim 15, wherein the display device is configured to be wearable by a user.

19. A terminal equipment comprising:

at least one processor configured to obtain description information of a three-dimensional scene;

the device for digitally generating holograms according to claim 18; and the display device configured to display the hologram, the display device being configured to be worn by the observer, said display device comprising:

the screen disposed at a predetermined distance from eyes of the observer, the plane coherent light source configured to illuminate said screen by a plane coherent light wave, said screen being configured to modulate the light waves emitted by the source depending on the hologram, the convergent lens disposed between the screen and said observer, such that the hologram is formed in the plane of the screen, and a waveguide or a beam separator configured to channel the light waves modulated by the screen in a visual field of the observer.

20. A system comprising:

a head-mounted display terminal equipment; and a server equipment comprising the device for digitally generating the hologram according to claim 18, and an emission system configured to emit data representative of the generated holograms to the terminal equipment, wherein the terminal equipment comprises the display device configured to display the hologram and configured to be worn by an observer, said display device comprising:

the screen configured to be placed at a predetermined distance from eyes of the observer, the plane coherent light source configured to illuminate said screen by a plane coherent light wave, said screen being configured to modulate the light waves emitted by the source depending on the hologram, the convergent lens disposed between the screen and said observer, such that the hologram is formed in the plane of the screen, and a waveguide or a beam separator configured to channel the light waves modulated by the screen in a visual field of the observer.

* * * * *